United States Patent
Patzelt et al.

[11] Patent Number: 6,039,350
[45] Date of Patent: Mar. 21, 2000

[54] MOTOR VEHICLE ADJUSTABLE TELESCOPIC STEERING COLUMN

[75] Inventors: Helmut Patzelt, Kernen; Gottfried Schremmer, Tamm, both of Germany

[73] Assignee: DaimlerChrysler AG, Stuttgart, Germany

[21] Appl. No.: 08/848,867

[22] Filed: May 1, 1997

[30] Foreign Application Priority Data

May 2, 1996 [DE] Germany ............................ 196 17 561

[51] Int. Cl.$^7$ .................................................. B62D 1/11
[52] U.S. Cl. ............................................ 280/775; 280/777
[58] Field of Search .................................... 280/777, 775, 280/750, 731; 74/493

[56] References Cited

U.S. PATENT DOCUMENTS

| | | | |
|---|---|---|---|
| 5,503,431 | 4/1996 | Yamamoto | 280/777 |
| 5,524,927 | 6/1996 | Toussaint | 280/777 |
| 5,575,501 | 11/1996 | Moriyama et al. | 280/777 |
| 5,769,455 | 6/1998 | Daval et al. | 280/777 |
| 5,787,759 | 8/1998 | Olgren | 74/495 |
| 5,803,496 | 9/1998 | Cymbal | 280/777 |

FOREIGN PATENT DOCUMENTS

| | | |
|---|---|---|
| 0 058 495 B1 | 4/1982 | European Pat. Off. . |
| 0 557 767 B1 | 6/1993 | European Pat. Off. . |
| 0 629 540 A1 | 6/1994 | European Pat. Off. . |
| 26 57 485 A1 | 6/1978 | Germany . |
| 32 05 416 A1 | 10/1982 | Germany . |
| 83 00 261 | 1/1983 | Germany . |
| 33 00 268 C2 | 4/1986 | Germany . |
| 33 39 926 C2 | 6/1986 | Germany . |
| 36 19 125 C1 | 10/1987 | Germany . |
| 29 04 205 C2 | 12/1987 | Germany . |
| 41 18 976 A1 | 1/1992 | Germany . |
| 41 18 863 C1 | 9/1992 | Germany . |
| 60472 | 3/1989 | Japan ...................................... 280/777 |

*Primary Examiner*—Kenneth R. Rice
*Assistant Examiner*—Kevin McKinley
*Attorney, Agent, or Firm*—Evenson McKeown Edwards & Lenahan, P.L.L.C.

[57] ABSTRACT

An adjustable telescopic steering column for motor vehicles has at least one longitudinally adjustable telescopic section which is held in an adjusted position by a locking device. In the event of a crash, the telescopic section is acted upon by an additional holding force by way of a locking part. The locking part is a component which operates independently of the locking device for the adjusted position and, in the operative position, is applied with a frictional connection to the longitudinally adjustable telescopic section.

12 Claims, 2 Drawing Sheets

MOTOR VEHICLE ADJUSTABLE TELESCOPIC STEERING COLUMN

BACKGROUND AND SUMMARY OF THE INVENTION

This application claims the priority of 196 17 561.5, the disclosure of which is expressly incorporated by reference herein.

The present invention relates to an adjustable telescopic steering column for motor vehicles and, more particularly, to a steering column having at least one longitudinally adjustable telescopic section which is held in an adjusted position by means of a locking device, and having a locking part which causes a holding force in the case of a crash which in a frictionally connected manner is applied to the adjustable telescopic section.

DE 29 04 205 C2 describes an adjustable telescopic steering column having an adjustable telescopic section held by a clamping device in a position which is determined as favorable as a result of a longitudinal and/or inclination adjustment. The clamping force required for this purpose is introduced by a swivellable operating lever which in a frictionally connected manner braces the legs of a bow surrounding the telescopic section in a U-shape with the walls of a vehicle-fixed holding part.

In the event of a crash of the vehicle with an impact by the occupant onto the steering wheel, a tilting movement of the known bow takes place and thus a tilting of the bow with the telescopic section, whereby an additional holding force is to be generated. This swivel movement of the bow requires, as a function of the force, a yielding deformation of the holding flanges of the bow on the walls of the holding part. The original clamping force between the bow and the holding part can no longer, however, be reliably obtained. The additional holding force becomes possible only with the impact by the occupant on the steering wheel.

DE 41 18 863 C1 discloses an adjustable telescopic steering column having an adjustable telescopic section held in different adjustable longitudinal and vertical positions by a clamping force introduced by an operating lever frictionally connected between console cheeks on both sides and a clamping body holding the telescopic section. In a vehicle crash, this clamping body is swivelled by the effect of a traction rope and is tilted with the adjustable telescopic section. Thereby, with the traction rope, the telescopic steering column can be pulled away from the occupant almost without any backlash. The clamping effect by the operating lever, by way of a clamping bolt on the console cheeks and the clamping body, is reduced by its swivelling.

EP 0 557 767 B1 describes an adjustable telescopic steering column for motor vehicles whose clamping force in the clamping device is intended to be improved in a crash by a certain alignment of the adjusting slot in the holding part.

DE 41 18 976 A1, DE 33 00 268 C2, EP 0 058 495 B1 and DE 83 00 261 U describe various adjustable telescopic steering columns which have a clamping locking system for the position-stable fixing of the telescopic sections on one another. This clamping locking system comprises vehicle-side and steering-column-side clamping legs which can be braced with respect to one another. As a result of the produced static friction, the telescopic sections are held on one another in an adjusted overlapping. When the vehicle is involved in a crash, this mechanical clamping device must be constructed with large clamping surfaces and a high bracing force. Otherwise, if its locking effect during the crash were discontinued because of the impacting occupant caused the steering wheel with its telescopic section to move in to the end stop, the driver would be stressed by high impact values in the case of the end stop.

Another approach for increasing the locking effect consists of constructing the clamping surfaces in a form-locking manner, as described in DE 36 19 125 C1 or DE 32 05 416 A1. A disadvantage in this approach, however, is a high-expenditure and difficult adjustability because the clamping surfaces are not completely detached from one another in order to maintain a certain adjusting resistance.

DE 33 39 926 C2 and DE 26 57 485 A1 describe safety steering columns having partial shafts which are fitted into one another. In the event of a crash, these shafts can be pushed further into one another, whereby a corrugated spring inserted between their walls is deformed in an energy-converting manner. A locking of the partial shafts to one another cannot be achieved by way of this corrugated spring. In addition, this energy-reducing process cannot be used in a telescopic steering column which permits a displacement of the partial shafts with respect to one another during the adjusting operation. A corresponding ball element which absorbs energy in a crash is also known from EP 0 629 540 A1.

An object of the present invention is to provide a telescopic steering column with an additional holding force for the adjustable telescopic section which acts early only in the case of a crash of the motor vehicle.

This object has been achieved in accordance with the present invention by constructing a locking part to act independently of the locking device for adjusting the position of the telescopic section.

The locking device for locking the adjustable telescopic section in the position desired for the occupant can be constructed here to be adapted to the vehicle with respect to the holding force and the operating comfort.

Only in the event of a crash, the independently acting locking part will be operated early, i.e. before the occupant impacts on the steering wheel, by way of the vehicle deceleration. As the result of its additional holding force, the locking part ensures the constant position of the longitudinally adjustable telescopic section. An influencing of the locking device for the adjusted position does not take place in this event.

Operation of the locking part by inertial force permits a simple and low-cost movement control. If useful, the locking part can also be changed into the operative position by a sensor-controlled adjusting device. A mechanical control of the acceleration-dependent operational point in time of the locking part can be implemented by a spring which keeps the locking part disengaged in a crash until the effect of the correspondingly high force takes place.

A bearing of the locking part on the position-stable telescopic section is advantageous for adjustability of the telescopic steering column because adjustment of its inclination will then have no influence on the necessary path of the locking part into the operative position in that the radial distance of the telescopic sections always remains the same.

The locking part can also be disposed independently of the telescopic steering column fixedly on the vehicle body, in which case additional possibilities exist for the arrangement of the locking part.

As a locking part, movable embodiments are suggested in the form of a wedge or a sheet metal strip, of a locking ball or a swivel cheek which can all be predetermined for an application case in a specific telescopic steering column construction.

The holding force of the locking part can also be adapted to the requirements recognized for a crash of the motor vehicle by a frictional application and/or a form-locking engagement on the adjustable telescopic section. Here, a deformation on the adjustable telescopic section, while reducing energy, may be additionally useful during the movement of the locking part into the operative position.

The movement of the locking part into the operative position can be transmitted by a toggle lever to another locking part which increasingly locks a movement of the adjustable telescopic section into the opposite direction or applies an additional holding force.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
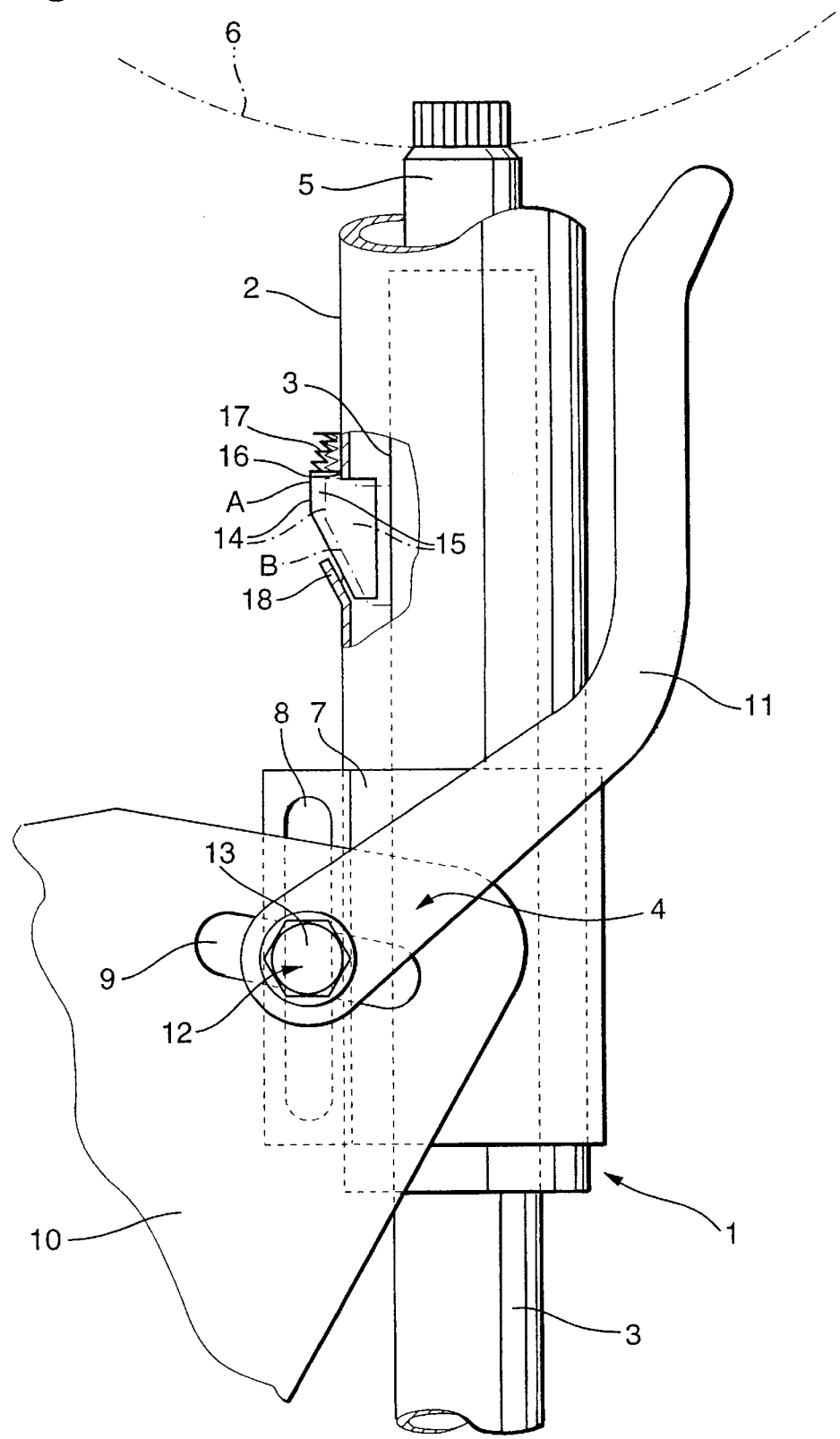
FIG. 1 is a side partial view of an adjustable telescopic steering column having a locking device and a locking part in the form of a sliding wedge which acts, in the event of a crash, in the inoperative position and in the operative position which is shown by a dash-dotted line.

FIG. 1 shows a section of a telescopic steering column 1 whose longitudinally adjustable telescopic section 2 can be displaced to a telescopic section swivellably linked on the end side and can be locked in different positions by a locking device 4. The adjustable telescopic section 2 allows a steering spindle 5 with a steering wheel 6 to be moved and adjusted to a height position and at a distance suitable to the vehicle occupant.

The locking device 4 has a locking bush 7 so that the adjustable telescopic section 2, by way of an oblong hole 8 on the locking bush 7, is adjustably guided in its length and by way of an oblong hole 9 on a vehicle body-fixed flange 10 extending at an angle thereto is adjustably guided in its inclination and is fixed by a clamping device 12 operated with a lever 11. The clamping device 12 comprises a bolt 13 which is axially moved by the swivel movement of the lever 11 and in the process also braces the vehicle-body-fixed flange 10 and the locking bush 7 with respect to one another as shown in principle in FIG. 2a.

In addition to the locking device 4 for locking the adjustable telescopic section 2 in adjusted positions, the section 2 is held by a locking part 14 in the event of a crash. This locking part 14, which operates independently of the locking device 4 and therefore does not influence the latter's holding force, is disposed on the longitudinally displaceable telescopic section 2 in the inoperative position A (solid line), and, in a crash, is displaced by the acceleration introduced into the telescopic steering column in the direction of the interior telescopic section 3 and, in the operative position B shown by dot-dash line, is placed in a frictional contact. Subsequently, the two telescopic sections 2, 3 are held on one another by an additional holding force which only has an effect in the event of a crash. Thereby, an unintentional longitudinal adjustment of the telescopic section 2 and of the steering wheel 6 is avoided.

The locking part 14 used in the present invention is a sliding wedge 15 which, in the inoperative position A, is disposed by a step 16 on the jacket of the telescopic section 2 and is held by a tension spring 17. The acceleration introduced in a crash into the displaceable telescopic section 2 causes the sliding wedge 15 to be guided, against the force of the tension spring 17, along the slope 18 on the telescopic section 2 in the direction of the telescopic section 3 and into frictional contact therewith. The tension spring 17 predetermines the force threshold at which the locking part 14 is to apply the additional holding force. The pressure onto the steering wheel 6, for example, as the result of the impact of the occupant onto the steering wheel 6 and onto the telescopic section 2, presses the sliding wedge 15 still closer onto the telescopic section 3.

Figure 2A:
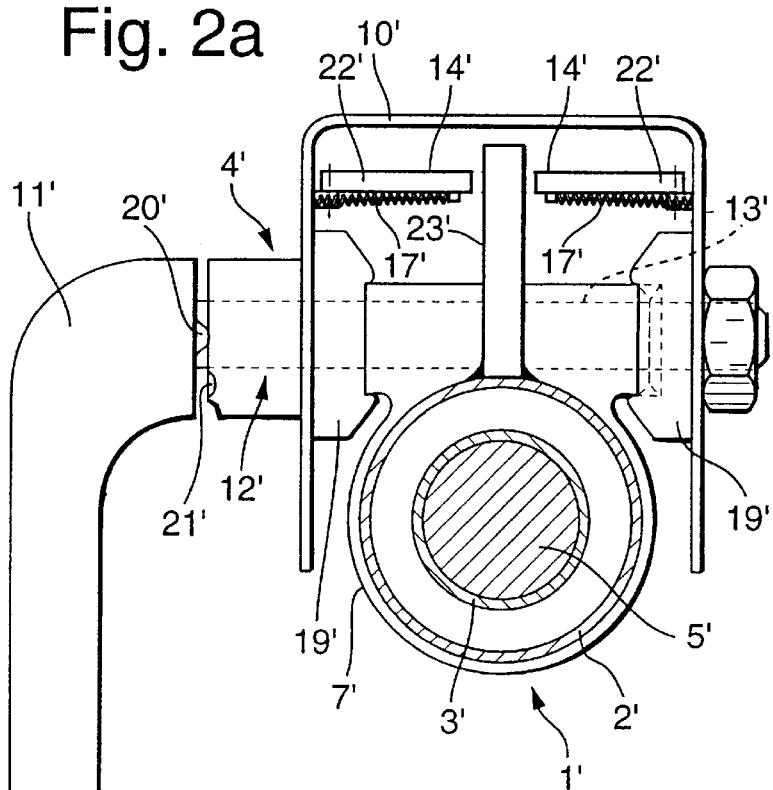
FIG. 2a is a cross-sectional view of an adjustable telescopic steering column having a locking device and a locking part, as a swivellable holding cheek, which acts in a crash, in the inoperative position.

FIG. 2a illustrates a correspondingly acting locking device 4' in which the telescopic section 2', together with a steering spindle 5' and the steering wheel 6', guided in oblong holes in the longitudinal and inclination direction, is longitudinally slidable with respect to the telescopic section 3, can be locked in the adjusted position which is advantageous for the occupant. The locking bush 7' is tensioned by the clamping device 12' with clamping cheeks 19' against the flange 10'. That is, the lever 11' is moved by a nose 20' out of an indentation 21', whereby the bolt 13' is pulled to the left in the drawing to apply the clamping force.

Holding cheeks 22', which are swivellably disposed, independently of the telescopic steering column 1', on the motor-vehicle-body-fixed flange 10', are a locking parts 14' which in a motor vehicle crash apply an additional holding force on both sides of a web 23' projecting away from the longitudinally displaceable telescopic section 2'.

Figure 2B:
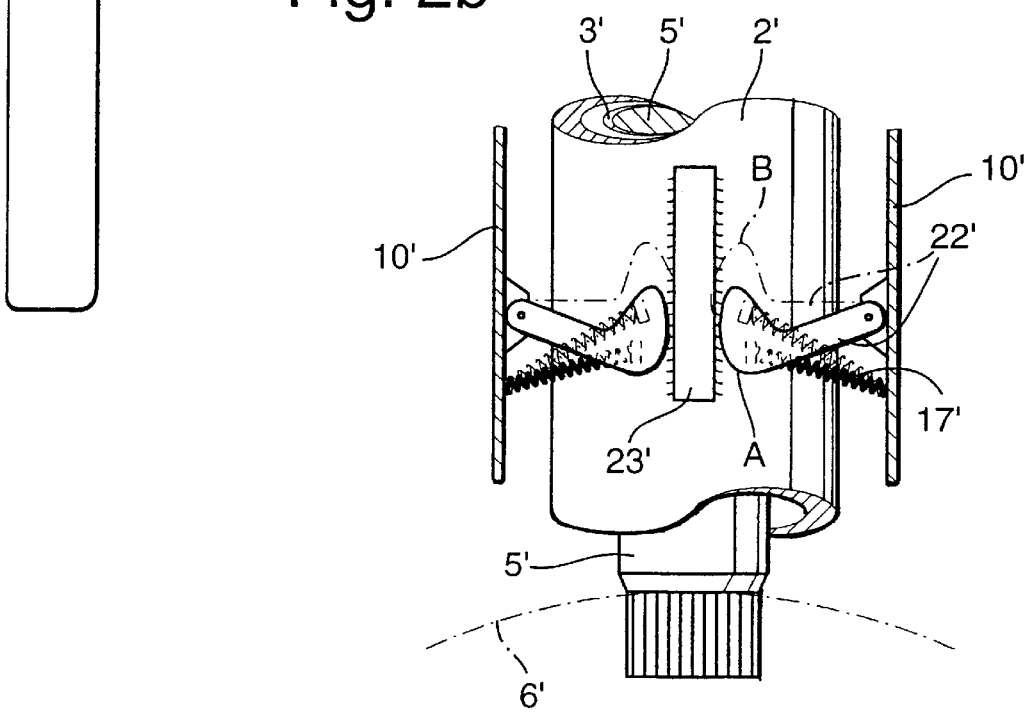
FIG. 2b is a top view of a cutout of FIG. 2a of the locking part in the inoperative position, and in the operative position, illustrated by a dash-dotted line, applied to the adjustable telescopic section.

As illustrated more clearly in FIG. 2b, as a result of the acceleration in the driving direction during impact in a crash, the holding cheeks 22' are swivelled from the inoperative position A (solid line) determined by the tension spring 17' into a frictional contact on the web 23'. During the swivelling into this holding operative position B illustrated by a dash-dot line, the holding cheeks 22' can be applied in a deforming manner to the adjustable telescopic section, in which case the moving energy can then also be converted into deforming energy.

In a further advantageous embodiment within the contemplation of the present invention, a locking part similar to the principle of the sliding wedge 15 can be a displaceable locking ball or a sheet metal strip which is changeable into its locking position by a displaceable mass-produced part. Furthermore, the movement of the locking part 14 into the operative position B can be transmitted by a toggle lever to another locking part which increasingly locks in the opposite direction or increases the locking effect.

Such an additional locking part 14, 14' for a possible crash may also be useful for supplementing a mechanically operating locking device 4, 4' as well as for an externally operated locking device. The locking part 14, 14' can also be constructed to be changeable into the operative position by a sensor-controlled adjusting device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Adjustable telescopic steering column for a motor vehicle, comprising a locking device, and at least one longitudinally adjustable telescopic section configured to be held in an adjusted position by the locking device, and a locking part configured to apply a frictional holding force to the adjustable telescopic section and is configured to act independently of the locking device for the adjusted position.

2. Adjustable telescopic column according to claim 1, wherein the locking part is configured to be rotated into the operative position.

3. Adjustable telescopic steering column according to claim 1, wherein the locking part is configured to be movably disposed on a section of the at least one telescopic section.

4. Adjustable telescopic steering column according to claim 1, wherein the locking part is fixedly disposed on the vehicle body independently of the telescopic steering column.

5. Adjustable telescopic steering column according to claim 1, wherein the locking part is configured to be displaceable against the force of a spring.

6. Adjustable telescopic steering column according to claim 1, wherein the locking part is a sliding wedge.

7. Adjustable telescopic steering column according to claim 1, wherein the locking part is a swivellable holding cheek.

8. Adjustable telescopic steering column according to claim 1, wherein the locking part is arranged to frictionally engage the adjustable telescopic section.

9. Adjustable telescopic steering column according to claim 3, wherein the locking part is configured to engage in a form-locking manner in the adjustable telescopic section.

10. Adjustable telescopic steering column according to claim 1, wherein the locking part deformingly engages on the adjustable telescopic section during movement of the locking part into the operative position.

11. Adjustable telescopic steering column according to claim 1, wherein the locking part is arranged such that movement thereof into an operative position is transmitted to a locking part which locks in a direction opposite to the movement.

12. Adjustable telescopic steering column according to claim 1, wherein the locking part is arranged to be placed into an operative position.

* * * * *